United States Patent
Bahadur et al.

(10) Patent No.: US 6,380,316 B1
(45) Date of Patent: Apr. 30, 2002

(54) POLYISOBUTYLENE COPOLYMERS HAVING REACTIVE SILYL GRAFTS

(75) Inventors: Maneesh Bahadur, Midland, MI (US); David Yen-Lung Chung, Bellaire, TX (US); Toshio Suzuki; Raymond Lee Tabler, both of Midland, MI (US); Hsien-Chang Wang, Bellaire, TX (US)

(73) Assignees: Dow Corning Corporation, Midland, MI (US); ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 09/260,456

(22) Filed: Mar. 2, 1999

(51) Int. Cl.$^7$ .................................................. C08F 8/00
(52) U.S. Cl. ........................ 525/263; 525/264; 525/265; 525/288
(58) Field of Search ................................ 525/263, 264, 525/265, 288

(56) References Cited

U.S. PATENT DOCUMENTS

| | | | |
|---|---|---|---|
| 3,634,381 A | 1/1972 | Lehnerer | 260/94.8 |
| 3,646,155 A | 2/1972 | Scott | 260/827 |
| 3,862,265 A | 1/1975 | Steinkamp | 260/878 R |
| 4,117,195 A | 9/1978 | Swarbrick et al. | 428/379 |
| 4,412,042 A | 10/1983 | Matsuura | 525/260 |
| 4,614,772 A | 9/1986 | Edwards | 525/388 |
| 5,244,976 A | 9/1993 | Brosius | 525/193 |
| 5,356,950 A | 10/1994 | White | 522/116 |
| 5,371,144 A | 12/1994 | Brosius et al. | 515/193 |
| 5,434,221 A | 7/1995 | White | 525/333.6 |

FOREIGN PATENT DOCUMENTS

| | | |
|---|---|---|
| DE | 1293671 | 10/1972 |
| DE | 821018 | 7/1996 |
| EP | 793581 | 12/1955 |
| EP | 004034 | 9/1979 |
| EP | 0035677 | 9/1981 |
| EP | 0111391 | 6/1984 |
| EP | 0320259 | 6/1989 |
| EP | 426073 | 5/1991 |
| EP | 821018 | 1/1998 |
| FR | 2293776 | 12/1975 |
| GB | 1346588 | 2/1974 |
| GB | 1450934 | 9/1976 |
| GB | 1485263 | 9/1977 |
| WO | WO 96/11959 | 4/1996 |
| WO | WO 96/40800 | 12/1996 |
| WO | WO 98/28347 | 7/1998 |

*Primary Examiner*—Bernard Lipman
(74) *Attorney, Agent, or Firm*—Alexander Weitz; Brent M. Peebles; Kevin M. Faulkner

(57) ABSTRACT

A copolymer of isobutylene with 0.5 to 15 mole percent of a conjugated diene (i.e., a butyl rubber) is reacted with a silane having both an alkenyl group as well as at least two silicon-bonded hydrolyzable group, the reaction taking place in the presence of a free-radical generator, to provide a modified copolymer having reactive silyl groups grafted thereto. The modified copolymer exhibits a reduced molecular weight relative to the starting copolymer and may be used to formulate moisture-curable sealants, caulks, adhesive and coatings.

22 Claims, No Drawings

POLYISOBUTYLENE COPOLYMERS HAVING REACTIVE SILYL GRAFTS

FIELD OF THE INVENTION

The present invention relates to polyisobutylene copolymers. More particularly, the invention relates to a copolymer of isobutylene and at least one conjugated diene which is grafted with an alkenyl-functional silane in the presence of a free-radical generator to provide a modified copolymer having reactive silyl functionality.

BACKGROUND OF THE INVENTION

Various organic polymers having moisture-sensitive silyl functionality are known in the art. Such systems may be prepared, for example, by hydrosilating a polymer having vinylic functionality along its main chain (or at terminals positions) with a reactive group-containing silane which also contains SiH functionality, the reaction being carried out in the presence of a catalyst such as platinum. When hydrocarbon polymers are so modified, they combine advantages inherent in moisture-curable silicone compositions with those of the hydrocarbon. That is, the modified polymer can be crosslinked via the reaction of hydrolyzable silyl groups at room temperature and the low gas and moisture permeability of the organic backbone is maintained. Therefore, such systems are eminently suitable for use as base polymers in sealants for gas barrier applications such as form-in-place gaskets, O-rings, rubber plugs/seals, medical and food container caps, and the like. However, the hydrosilation methods conventionally used to prepare such modified polymers and their precursors are expensive and complicated.

A different approach for preparing certain polymers having moisture-sensitive silyl functionality has been suggested by Scott in U.S. Pat. No. 3,646,155. This patent teaches that polyethylene, or a copolymer of ethylene with minor portions of propylene and/or butylene, can be reacted with a silane which bears both an aliphatically unsaturated group as well as a hydrolyzable group, the reaction taking place in the molten state and in the presence of a free-radical generating compound. The resulting modified polyethylene was crosslinked by exposing it to moisture, typically steam. Of course, such an ethylene polymer or copolymer generally has a high molecular weight and must be processed at temperatures above the melt point (typically above 140° C. according to Scott). Further, all of the examples of the Scott patent indicate that the melt index, which is inversely related to melt viscosity, actually decreases upon modification with the silane. Scott points out that his cured compositions generally exhibit properties similar to those of corresponding peroxide-cured systems. However, it is clear that the moisture-curable modified polymers taught by Scott must be processed/fabricated at high temperatures and are certainly not suited for the production of room-temperature vulcanizable (RTV) sealant compositions.

SUMMARY OF THE INVENTION

It has now been found that a copolymer of isobutylene with a conjugated diene can be reacted with a silane having both an alkenyl group and a silicon-bonded hydrolyzable group, the reaction being carried out in the presence of a free-radical generator, to provide a modified silyl-functional copolymer. Further, this silyl-functional copolymer, which can be crosslinked by exposure to moisture, exhibits a number average molecular weight (typically 2,000 to 50,000) which is considerably lower than that of the initial unmodified copolymer. In view of the relatively low gas and moisture permeability of the modified copolymer and its low viscosity at room temperature (i.e., can easily be dispensed from a caulking gun), it is an ideal base polymer for formulating sealants for gas barrier applications. Moreover, sealants prepared from such modified copolymers have similar properties to those based on the previously discussed expensive systems prepared by hydrosilation techniques.

The invention, therefore, relates to a method comprising: reacting (A) 100 parts by weight of a copolymer of isobutylene with 0.5 to 15 mole percent of at least one $C_4$ to $C_{14}$ conjugated diene, said copolymer having a number average molecular weight of about 5,000 to 500,000 and (B) 1 to 50 parts by weight of a silane having the formula

wherein R is an alkenyl group having 2 to 10 carbon atoms, R' is independently selected from hydrocarbon or halogenated hydrocarbon groups which contain no aliphatic unsaturation, X is a silicon-bonded hydrolyzable group selected from alkoxy, acyloxy, ketoxime, amino, amido, aminoxy or alkenyloxy groups, and n is 2 or 3, said reaction taking place in the presence of (C) 0.5 to 10 parts by weight of a free-radical generator, whereby said silane is grafted onto said copolymer and the number average molecular weight of the latter is reduced, typically by fifty percent or more.

The invention further relates to a modified isobutylene copolymer prepared by the above method.

DETAILED DESCRIPTION OF THE INVENTION

The copolymer (A) is an interpolymer of 85 to 99.5 mole percent of isobutylene with 15 to 0.5 mole percent of $C_4$ to $C_{14}$ conjugated diene. Such copolymers are well known in the art and are also referred to as "butyl rubber." Typical conjugated dienes may be illustrated by isoprene, butadiene, 2,3-dimethyl butadiene, piperylene, 2,5,-dimethylhexa-2,4-diene, cyclopentadiene, cyclohexadiene and methylcyclopentadiene. It is preferred that component (A) is a copolymer of isobutylene with isoprene, the latter monomer preferably being present at a level of 0.5 to 4 mole percent, most preferably at 2 to 3 mole percent. Typically, this copolymer has a number average molecular weight ($M_n$) of about 5,000 to 500,000, preferably greater than 50,000, more preferably 100,000 to 300,000, before it is modified according to the instant method.

Silane (B) has the formula $$R\text{---}SiX_n R'_{3-n} \tag{i}$$

wherein R is an alkenyl group having 2 to 10 carbon atoms which may be illustrated by vinyl, allyl, butenyl, pentenyl, hexenyl, heptenyl, octenyl and decenyl. Either straight chain or branched groups may be used but the unsaturation must be a vinylic type (i.e., having a terminal unsaturated moiety). Preferred alkenyl groups are vinyl, allyl and hexenyl. R' in formula (i) may be independently selected from hydrocarbon or halogenated hydrocarbon groups which contain no aliphatic unsaturation. These may be specifically exemplified by alkyl groups having 1 to 20 carbon atoms, such as methyl, ethyl, propyl, butyl, pentyl, hexyl, octyl, decyl and dodecyl; cycloalkyl groups, such as cyclohexyl and cycloheptyl; aryl groups having 6 to 12 carbon atoms, such as phenyl, tolyl and xylyl; aralkyl groups having 7 to 20 carbon atoms, such as benzyl and phenylethyl; halogenated alkyl groups having 1 to 20 carbon atoms, such as 3,3,3-trifluoropropyl and chloromethyl; and halogenated aryl groups having 6 to 12 carbon atoms, such as chlorobenzyl, chloronaphthyl. X in the above formula is a silicon-bonded hydrolyzable group selected from alkoxy, acyloxy, ketoxime, amino, amido, aminoxy or alkenyloxy groups, and preferably contains no more than 6 carbon atoms. Specific examples of such hydrolyzable groups include methoxy, ethoxy, propoxy, butoxy, acetoxy, propionoxy, —ON=C(Me)$_2$, —ON=C(Et)(Me), —ON=C(Ph)$_2$, —NH(Me), —NH(Et), and —NH(Ph)$_2$, wherein Me, Et and Ph hereinafter denote methyl, ethyl and phenyl groups, respectively. Preferably, X is an alkoxy group having 1 to 4 carbons, most preferably a methoxy group. Finally, the subscript n in formula (i) is an integer having a value of 2 or 3. Highly preferred specific silanes are methylvinyldimethoxysilane, vinyltrimethoxy-silane and hexenyltrimethoxysilane The type of free-radical generator (C) used in the method of the present invention is not specifically limited. This organic component generates free-radicals upon heating and may be selected from any of the known azo or diazo compounds, such as 2,2'-azobisisobutyronitrile and phenyl-azo-triphenylmethane. Preferably, the free-radical generator is selected from organic peroxides such as hydroperoxides, diacyl peroxides, ketone peroxides, peroxyesters, dialkyl peroxides, diaryl peroxides, aryl-alkyl peroxides peroxydicarbonates, peroxyketals, peroxy acids, acyl alkylsulfonyl peroxides and alkyl monoperoxydicarbonates.

Specific examples of suitable peroxides which may be used according to the method of the present invention include benzoyl peroxide, t-butyl peroxy o-toluate, cyclic peroxyketal, t-butyl hydroperoxide, t-butyl peroxypivalate, lauroyl peroxide and t-amyl peroxy 2-ethylhexanoate, 1,3-bis(t-butylperoxyisopropyl) benzene, 2,2,4-trimethylpentyl-2-hydroperoxide, 2,5-bis(t-butylperoxy)-2,5-dimethylhexyne-3, cumyl hydroperoxide, t-butyl peroxybenzoate and diisopropylbenzene mono hydroperoxide, inter alia. For the purposes of the process of the invention, it is preferred that the peroxide is selected from dicumyl peroxide and di-t-butyl peroxide.

In order to produce a modified copolymer according to the instant method, copolymer (A) is reacted with silane (B) in the presence of free-radical generator (C). This reaction results in a degradation of the copolymer (chain scission) such that $M_n$ is reduced, preferably by at least 50%, but typically by about an order of magnitude. Thus, for example, when $M_n$ of copolymer (A) is initially about 500,000, the modified copolymer can have an $M_n$ of about 50,000. Similarly, when $M_n$ of copolymer (A) is initially about 50,000, the modified copolymer can have an $M_n$ of about 2,000 to 5,000, the above two examples being illustrative of expected values and not to be interpreted as limiting the invention. As the above chain scission occurs, there is a concurrent grafting of the reactive silyl functionality onto the resulting cut chains via the alkenyl groups on the silane. Silane (B) is used in excess relative to the stoichiometric amount of desired silyl grafts on the final modified copolymer and the molar amount of silane used is preferably from 1 to 10 times the molar amount of silyl groups in the latter. Typically, from 15–100 moles of the silane are used for each mole of the copolymer (A), in order to produce a moisture-curable modified copolymer which preferably has a molar silyl group content of at least 1.5 per mole of the lower molecular weight polymer. Free-radical generator (C) is preferably used at a level sufficient to provide from 0.001 to 1 mole, preferably 0.01 to 0.1 mole, of (C) for each mole of silane (B) employed. For efficiency of grafting and chain scission, it is preferred that the free-radical generator have a half life of less than about one tenth of the residence time at the temperature of the reaction.

The reaction according to the method of the present invention may be carried out in any equipment capable of uniformly dispersing components (B) and (C) in copolymer (A) and heating the resulting blend to 50 to 300° C., preferably 100 to 250° C., so as to graft the silane onto the copolymer. Suitable equipment for this purpose includes bowl mixers, kneader mixers, single-screw extruders, twin-screw extruders and internal mixers, among others.

It is contemplated that mixing and reacting all the components can be carried out in the same apparatus and as a single unit operation. Alternatively, components (B) and (C) may be dispersed in (A) at a temperature below the decomposition temperature of the free-radical generator and this blend subsequently heated to activate the free-radical generator. The reaction may be accomplished in either batch or continuous fashion. Mixing and reacting may be carried out either neat or in the presence of a plasticizer or solvent as long as the latter does not react with any of the components under these conditions. Suitable diluents for this purpose can be, for example, saturated hydrocarbons, aromatic hydrocarbons and perhalogenated hydrocarbons, specific examples being benzene, toluene and xylene. Of course, reaction temperature and/or pressure are adjusted so as to contain such a diluent during the reaction, such parameters being readily determined by routine experimentation.

As mentioned above, the number average molecular weight of the copolymer modified according to the method of the present invention is typically at least 50% lower than the initial copolymer (A), this reduction also resulting in a lower viscosity. Moreover, it has been observed that the molecular weight distribution of the modified copolymer is considerably broader than that of its precursor (i.e., the polydispersity=$M_w/M_n$, in which $M_w$ is weight average molecular weight, is greater than that of initial copolymer). Generally, the polydispersity of the modified copolymer is at least 4 and more typically is 8 to 12. Those skilled in the art will appreciate that such a molecular weight broadening in the modified copolymer, at a given $M_n$, is associated with increased toughness of a cured composition based thereon.

The modified copolymer, described supra, can be formulated with a condensation catalyst (D), as well as other components conventionally employed in the art, to form a moisture-curable sealant, caulk, coating or adhesive. In general, the condensation catalyst can be any compound which will promote the condensation reaction between SiOH groups, which are generated during hydrolysis of the X groups on the modified copolymer, so as to cure the instant composition by the formation of —Si—O—Si— bonds. Examples of suitable catalysts include carboxylates of such metals as tin, titanium bismuth, lead and zirconium. Examples of tin catalysts include dibutyltin diacetate, dibutyltin dilaurate, tin tripropyl acetate, stannous octoate, stannous oxalate, stannous naphthanate, dibutylbis (2,4-pentadionate)tin. Specific titanates include tetra butyl titanate, titanium diisopropoxy-bis-ethylacetoacetate, tetraisopropoxy titanate and tetra(t-butyl) titanate. Additionally, amines such as triethylamine, ethylenetriamine, butylamine, octylamine, dibutylamine, monoethanolamine, diethanolamine, triethanolamine, diethylenetriamine, triethylenetetramine, cyclohexylamine, benzylamine, diethylaminopropylamine, xylylenediamine, triethylenediamine, guanidine, diphenylguanidine and morpholine can be used as catalysts. Preferably, condensation catalyst (D) is selected from the above described tin carboxylates, alkyl titanoates or mixtures thereof.

In addition to the above ingredients, the moisture-curable compositions may contain optional components such as fillers, pigments, water scavengers, plasticizers, stabilizers, cure agents, adhesion promoters, antioxidants, ultraviolet adsorbents, lubricants, pigments, foaming agents, tackifiers, and the like. These additional components are, of course, only employed if they do not detract from curability or stability of the compositions.

In order to prepare a moisture-curable composition, 100 parts by weight of the modified copolymer is thoroughly mixed with a sufficient amount of the silanol condensation catalyst to cure said composition upon exposure to moisture, the latter catalyst content preferably being 0.1 to 10, more preferably 0.5 to 6.0, parts by weight. Mixing order is not critical but must be carried out under water-free conditions so as to preserve the hydrolyzable groups on the polymer. Typically, mixing of the above mentioned as well as the optional components is carried out under a dry gas atmosphere (e.g., dry nitrogen) in any apparatus capable of dispersing the components to form a uniform blend. Suitable mixers include twin-screw extruders, double planetary mixers, and the like.

The above curable compositions may be packaged either as one-part or two-part systems, as conventionally practiced in the silicone sealant art, and are particularly suited for construction sealants, general purpose sealant, caulks, sealers and adhesives,

EXAMPLES

The following examples are presented to further illustrate the method of this invention, but are not to be construed as limiting the invention, which is delineated in the appended claims. All parts and percentages in the examples are on a weight basis and all measurements were obtained at 25° C. unless indicated to the contrary.

Materials butyl-1=Polysar™ Butyl rubber 402, marketed by Bayer Corporation, Akron, Ohio., is described as a copolymer of isobutylene and isoprene containing 2.2 mole percent unsaturation. Gel permeation chromatography for this polymer indicated
$M_n=1.375 \times 10^5$, $M_w=4.11 \times 10^5$ and $M_w/M_n=2.98$.

butyl-2=Polysar™ Butyl rubber 402, as defined above and having $M_n=1.51 \times 10^5$,
$M_w=4.00 \times 10^5$ and $M_w/M_n=3.47$.

DCPO=Dicumyl peroxide (98%) marketed by Aldrich Chemical Co., Milwaukee, Wis.

PIB=Vistanex™ LM-MS-LC, a polyisobutylene homopolymer marketed by Exxon Chemical Co, Baytown, Tex. Gel permeation chromatography indicated $M_n=18,000$ and
$M_w/M_n=3.24$.

Silane-1=Vinyltrimethoxysilane marketed by Aldrich Chemical Co., Milwaukee, Wis.

Silane-2=Methylvinyldimethoxysilane (97%) marketed by Gelest Corporation, Tullytown, Pa.

Varox™-130=2,5-dimethyl-2,5-di(tert-butylperoxy)-hexyne-3 (90%) marketed by R.T. Vanderbilt Co.,Inc., Norwalk, Conn.

Procedures:

Gel Permeation Chromatography (GPC): A size-exclusion chromatograph (Waters Corporation, Milford, Mass.) equipped with a Waters 410 differential refractometer detector and two PL gel mixed C columns (300×7.5 mm) with a guard column (manufactured by Polymer Labs, Foster City, Calif.) were used for the determination of molecular weights. The measurements were made at 35° C. using a flow rate of 1.0 mL/min in tetrahydrofuran solvent. The system was calibrated with ten polyisobutylene standards ranging in molecular weight from 3,500 to 422,000. Samples were prepared at 0.02 weight percent in prefiltered, stabilized tetrahydrofuran.

Gel content measurements: Each grafted butyl copolymer was mixed with 30–35 weight percent of Daphne oil KP100-U (supplied by Apollo America Corp., Southfield, Mich.), 2.5–3.5 weight percent of stannous octoate condensation catalyst (supplied by Gelest, Tullytown, Pa.) and 2–3 weight percent water. The Daphne oil KP100-U is a non-reactive plasticizer which was added facilitate mixing and curing. The mixture was cured by immersing in water for 24 hours at room temperature and then a preweighed amount of the crosslinked copolymer was extracted with hexane in a Soxhlet apparatus for 24 hours. Gel content is reported as the percentage of crosslinked copolymer which was not extracted.

Silicon nuclear magnetic resonance ($^{29}$Si NMR) spectra were obtained to confirm the presence of silicon moieties in the copolymers.

Examples 1–2

Butyl-1 was reacted with a mixture of DCPO and silane-2 in a Haake Rheocord™ 90 mixer (supplied by Fisons Instruments, Saddlebrook, N.J.) equipped with a Rheomix™ model 3000 (capacity 300 grams) bowl and sigma blades. The butyl-1 copolymer was added to the bowl in small increments at 185° C. followed by addition of the mixture of DCPO and silane. The amounts and the operating conditions for the mixer are shown in Table 1. Results of GPC and NMR analysis are shown in table 2, along with the gel content of cured copolymers according to the above described procedure.

TABLE 1

| Ex. | RPM | Temp. (° C.) | Butyl-1 (g) | Initial Torque (Nm) | Silane-2 (g) | DCPO (g) | Reaction Time (min.) | Final Torque (Nm) |
| --- | --- | --- | --- | --- | --- | --- | --- | --- |
| Ex. 1 | 20 | 185 | 190 | 55 | 19 | 5.84 | 35 | 5.0 |
| Ex. 2 | 100 | 185 | 170 | 25 | 18 | 5.00 | 40 | 4.0 |

TABLE 2

| Ex. | $^{29}$Si NMR | $M_n$ | $M_w$ | $M_w/M_n$ | Gel Content (%) |
|---|---|---|---|---|---|
| Ex. 1 | 2 broad peaks in (-40) to (-42) ppm region | $1.39 \times 10^4$ | $1.42 \times 10^5$ | 10.21 | 75 |
| Ex. 2 | 2 broad peaks in (-40) to (-42) ppm region | $1.23 \times 10^4$ | $1.15 \times 10^5$ | 9.32 | 75 |

The $^{29}$Si NMR peak position confirmed the presence of grafted alkoxysilyl groups on the resulting copolymers in each case. Molecular weight data confirms that initial copolymers were also degraded to lower molecular weights. Further, the grafted copolymers were shown to be moisture-curable, as indicated by the gel content measurements.

Example 3

A sample of butyl-2 (1,100 g) was blended with silane-2 (175 g) and DCPO (70 g) in a one-quart Baker-Perkins mixer (B&P Process Equipment & Systems; Saginaw, Mich.) equipped with sigma blades. This premix was then fed to a continuous single screw extruder to heat and effect a reaction quickly before the incorporated silane-2 could evaporate. The extruder was a Killion™ Single Screw Extruder (Davis-Standard Killion; Cedar Grove N.J.; Model KL-100). The extruder had 3 heated zones and a heated extrusion slit die. The zones (from inlet to outlet) were set at 174, 179 and 180° C., respectively while the die was heated to 145° C. The screw speed was 25 RPM (revolutions per minute) and 100 RPM. At 25 RPM, output was collected at a rate of approximately 2 grams per minute (Example 3A). At 100 RPM, output was collected at a rate of approximately 10 grams per minute (Example 3B).

The results of gel permeation chromatography and gel content determination are shown in Table 3.

TABLE 3

| | $M_n$ | $M_w$ | $M_{w/Mn}$ | Gel Content (%) |
|---|---|---|---|---|
| Ex. 3A | $1.31 \times 10^4$ | $8.35 \times 10^4$ | 6.35 | 55 |
| Ex. 3B | $1.67 \times 10^4$ | $9.15 \times 10^4$ | 5.48 | 76 |

(Comparative) Example 4

A 100 g sample of PIB was placed in a resin kettle fitted with a water condenser, nitrogen inlet, and mechanical stirrer. The polymer was heated to 70° C. Silane-1 (10 g) and Varox™-130 (0.6 g) were added to the kettle. The kettle was purged with dry nitrogen and the contents heated at 200° C. for 1–2 hours. The contents were cooled to 100° C. and more Varox™-130 (0.5 gm) was added. The contents were heated at 200° C. for another hour and then volatiles as well as excess reagents were removed at 90° C. under vacuum for 2 hours. The polymer was analyzed by $^1$H NMR. GPC indicated Mn=3,450 and Mw/Mn=3.08, showing that degradation of the polymer had taken place. However, $^{29}$Si NMR showed that no grafting of silyl groups had taken place.

That which is claimed is:

1. A method comprising: reacting
    (A) 100 parts by weight of a copolymer of isobutylene with 0.5 to 15 mole percent of at least one $C_4$ to $C_{14}$ conjugated diene, said copolymer having a number average molecular weight of 5,000 to 500,000, and
    (B) 1 to 50 parts by weight of a silane having the formula

wherein R is an alkenyl group having 2 to 10 carbon atoms, R' is independently selected from hydrocarbon or halogenated hydrocarbon groups which contain no aliphatic unsaturation, X is a silicon-bonded hydrolyzable group selected from alkoxy, acyloxy, ketoxime, amino, amido, aminoxy or alkenyloxy groups, and n is 2 or 3, said reaction taking place in the presence of
    (C) 0.5 to 10 parts by weight of a free-radical generator, whereby said silane is grafted onto said copolymer and the number average molecular weight of the latter is reduced by at least 50%; thereby producing a polymer having a number average molecular weight of from 2,000 to 50,000.

2. The method according to claim 1, wherein said free-radical generator is an organic peroxide.

3. The method according to claim 1, wherein R is selected from the group consisting of vinyl, allyl and hexenyl, X is an alkoxy group having 1 to 4 carbon atoms.

4. The method according to claim 1, wherein said diene is isoprene.

5. The method according to claim 4, wherein said free-radical generator is an organic peroxide.

6. The method according to claim 5, wherein R is selected from the group consisting of vinyl, allyl and hexenyl, X is an alkoxy group having 1 to 4 carbon atoms.

7. The method according to claim 6, wherein said peroxide is selected from the group consisting of dicumyl peroxide and di-t-butyl peroxide and said silane is selected from the group consisting of methylvinyldimethoxysilane and vinyltrimethoxysilane.

8. The method according to claim 1, wherein said reaction takes place in an extruder.

9. The method according to claim 8, wherein said diene is isoprene.

10. The method according to claim 9, wherein said free-radical generator is an organic peroxide.

11. A silyl-functional polyisobutylene copolymer prepared by the method of claim 1.

12. A silyl-functional polyisobutylene copolymer prepared by the method of claim 2.

13. A silyl-functional polyisobutylene copolymer prepared by the method of claim 3.

14. A silyl-functional polyisobutylene copolymer prepared by the method of claim 4.

15. A silyl-functional polyisobutylene copolymer prepared by the method of claim 5.

16. A silyl-functional polyisobutylene copolymer prepared by the method of claim 6.

17. A silyl-functional polyisobutylene copolymer prepared by the method of claim 7.

18. A silyl-functional polyisobutylene copolymer prepared by the method of claim 8.

19. A silyl-functional polyisobutylene copolymer prepared by the method of claim 9.

20. A silyl-functional polyisobutylene copolymer prepared by the method of claim 10.

21. The method of claim 1, wherein the reaction is carried out in the absence of a solvent.

22. The method of claim 1, wherein the polydispersity of the polymer produced is greater than 4.

* * * * *